Feb. 21, 1961
M. F. BECHTOLD
2,972,511
PROCESS FOR COAGULATING AND COALESCING
ACRYLONITRILE DISPERSIONS IN AQUEOUS
INORGANIC SALT SOLUTIONS
Filed Nov. 22, 1952
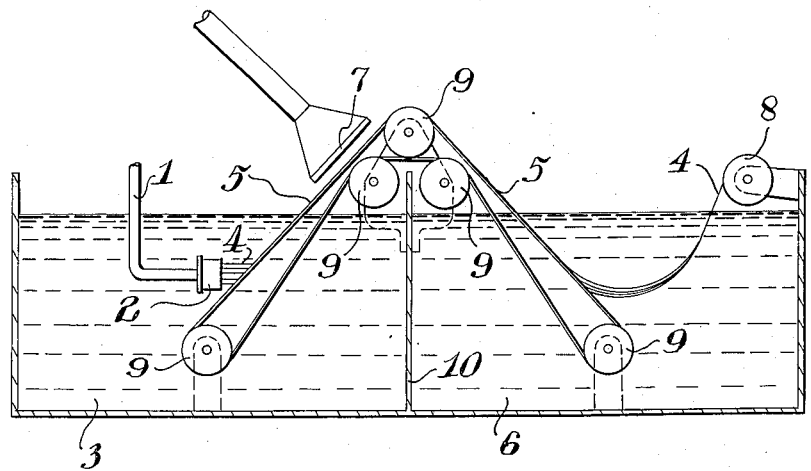
INVENTOR
MAX FREDRICK BECHTOLD
BY C. H. Mortenson
ATTORNEY United States Patent Office 2,972,511
Patented Feb. 21, 1961

2,972,511
PROCESS FOR COAGULATING AND COALESCING ACRYLONITRILE DISPERSIONS IN AQUEOUS INORGANIC SALT SOLUTIONS

Max Fredrick Bechtold, Kennett Square, Pa., assignor to E. I. du Pont de Nemours and Company, Wilmington, Del., a corporation of Delaware Filed Nov. 22, 1952, Ser. No. 322,011

11 Claims. (Cl. 18—54)

This invention relates to a new process for the preparation of shaped articles from aqueous dispersions of acrylonitrile polymers. More particularly, it pertains to the production of valuable acrylonitrile polymer filamentary materials from aqueous polymer dispersions.

Shaped articles from organic polymers that do not melt are usually fabricated from solutions of the polymers. Organic solvents are, in general, used. These are disadvantages because of their high cost, the expense of solvent removal and recovery, explosive and toxic hazards involved and because of chemical instability. Certain organic polymers have been found to be soluble in concentrated aqueous solutions of certain salts. Satisfactory fabrication of these polymer solutions would obviate the disadvantages of organic solvents. However, attempts to prepare for spinning with an aqueous salt solvent a solution that is both high in polymer content and that contains high molecular weight polymer lead to degradation of the polymer due to the heating required because of the extremely high viscosity developed as the concentration of dissolved high molecular weight polymer increases. Compromises on either lower polymer content or lower molecular weight polymer to attain a viscosity sufficiently low for fabrication generally give an inferior quality product and/or increased cost.

Many polymers, particularly the vinyl type polymers, are most readily made as aqueous dispersions, that is, they are polymerized in an aqueous medium in which the polymer, and many times the monomer, is insoluble. Dispersions of solids content of up to 50% by weight are easily obtained and the viscosity is independent of the molecular weight of the dispersed polymer. Heretofore, the polymer had to be isolated from the dispersion and shaped into articles by means of a melt or solution process. Processes permitting the use of the aqueous dispersions directly would be highly advantageous.

Accordingly, it is an object of this invention to provide a process for the preparation of useful shaped articles from aqueous polymer dispersions. It is a further object to provide processes for spinning fibers and casting films from water-insoluble acrylonitrile polymers dispersed in aqueous media. It is a further object to provide a shaping process which does not involve organic solvents nor the isolation of the polymer from the dispersion prior to shaping. It is a particular object to provide a process for spinning fibers and casting films directly from the unmodified aqueous dispersions of acrylonitrile polymers obtained by the polymerization of acrylonitrile in an aqueous medium. Other objects will be readily apparent from the description of the process as hereinafter set forth.

The objects of this invention are accomplished by extruding an aqueous dispersion of a water-insoluble acrylonitrile polymer through a shaped orifice into an aqueous bath, which contains a strong electrolyte, exposing the shaped structure to an aqueous salt solution which is a solvent for the polymer and collecting the shaped article. By aqueous dispersion is meant an aqueous medium containing discrete particles of polymer homogeneously dispersed therein, whether the particles be in the colloidal range, that is 0.005 micron to 0.2 micron, or larger. Preferably, the dispersion is obtained by polymerizing acrylonitrile alone or conjointly with another polymerizable unsaturated monomer dispersed in an aqueous medium. The polymer dispersion, preferably containing from 10–50% and usually 20% to 40%, by weight of polymer, can be extruded through a shaped orifice into an aqueous salt solution which exerts solvent action on the shaped structure. The time exposure to the solvent action is so regulated that the polymer in the shaped structure coalesces but does not dissolve. During this coalescing action the structure becomes strong and rubbery. Preferably the polymer dispersion is extruded into an aqueous medium containing a strong electrolyte, which may or may not be a solubilizing salt, and thereafter the weak coagulated shaped structure is exposed momentarily to an aqueous solution containing enough solubilizing salt to dissolve the polymer. The exposure to the coalescing action of a solubilizing salt solution may be accomplished by passing the coagulated polymer article through such a solvent solution or by air drying the shaped article which has occluded minor amounts of a solubilizing salt. In either method, after the coalescing action, the shaped structure may be stretched several times its length and/or width in its rubbery state and subsequently washed salt free in water at room temperature while being held under tension. A hard non-rubbery film or fiber results which can be subsequently drawn at elevated temperatures to yield a strong, highly oriented shaped article.

By the process described above and in further detail below, fibers, filaments, threads, films, foils, tapes, ribbons, bristles and the like are readily and economically prepared.

The figure shows diagrammatically one method of preparing shaped articles by the process of this invention.

In the examples, which are given for illustrative purposes only and are not limitative and which show the wide scope of this invention, the parts are by weight and all processes were carried out at room temperature (about 25° C.) unless otherwise stated.

*Example 1*

An aqueous dispersion of polyacrylonitrile was prepared from the following ingredients:

0.10 part potassium persulfate
0.033 part sodium bisulfite
2.0 parts sodium lauryl sulfate
120 parts of water
80 parts of acrylonitrile The above substances were placed in a container capable of containing 350 parts of water, and the free space of the bottle was flushed with nitrogen gas and the bottle was then sealed. After mixing the contents by relatively mild agitation of the bottle for 16 to 17 hours at 40° C., the resulting polymer dispersion contained 39% solid material as determined by evaporation of a portion of the dispersion at 60° C. The aqueous dispersion was extruded through an orifice into a 56% by weight aqueous solution of calcium thiocyanate. The filament obtained was passed through the thiocyanate bath for a distance of 3 feet. After removal from the bath it was stretched 3 times its length in air and subsequently washed salt free in water at room temperature at constant length on a bobbin. A hard, non-rubbery fiber resulted which was subsequently drawn twice its length over a hot plate at 180° C. The resulting filament had a tenacity of 3 grams per denier at a break elongation of 8%. Its modulus was 90 grams per denier.

In a second experiment the rubbery filament was washed upon removal from the thiocyanate bath and subsequently drawn 5 times its length over the hot plate at 180° C. Equally strong fiber resulted from this procedure.

*Example II*

Into a container equipped with a variable speed stirrer, a reflux condenser cooled with ice water, and a nitrogen bleed and immersed in a water bath maintained at 40° C., were placed 120 parts of water, 2 parts of sodium lauryl sulfate, 0.1 part potassium persulfate and 0.033 part sodium bisulfite. A rapid stream of nitrogen was bubbled through to remove oxygen from the flask and its contents. To the stirred aqueous medium was then added 80 parts of redistilled acrylonitrile. After an induction period of 2 minutes the reaction commenced, as indicated by the appearance of a blue opalescence in the aqueous layer. The reaction was allowed to proceed for 150 minutes. The product was a smooth, milky-white, fluid dispersion. By evaporation of an aliquot portion, the total solids content was found to be 39.2%. The intrinsic viscosity of a sample of the polymer as measured in dimethylformamide was found to be 7.8, which corresponds to weight average molecular weight of about 270,000.

The dispersion was extruded through a monofil glass capillary spinneret of inside diameter of .006" into a bath consisting of 2% aqueous solution of sodium thiocyanate. The dispersion coagulated immediately into a white filament which was removed from the bath on a support, the continuous belt apparatus shown in the figure. The belt, travelling at 5 yards per minute, removed the filament from the coagulating bath and transferred it to a saturated aqueous solution of sodium thiocyanate at 25° C. Within a few seconds after being immersed in the concentrated salt solution, the fiber coalesced to a clear gel structure, and was removed from this bath after 3 feet of travel, washed with water and continuously wound on a bobbin. When afterdrawn 5 times its original length, the product of this example yields smooth strong filaments of physical properties similar to those cited in Example I.

*Example III*

The aqueous polymer dispersion of Example II was extruded through a six hole glass capillary spinneret, the internal diameter of each hole being 0.006", into a 2% aqueous solution of hydrochloric acid. The bundle of coagulated filaments was transferred by the belt apparatus to a bath consisting of 70% aqueous zinc chloride solution. The fibers were coalesced to a bundle of gel filaments with 3 feet of travel at 5 yards per minute, and were washed free from salt with water and wound on a bobbin continuously.

*Example IV*

The aqueous polymer dispersion of Example II was extruded through a monofil glass capillary spinneret of internal diameter of .004" into a bath consisting of 5.7% aqueous solution of calcium thiocyanate. The filament thus formed was carried through the bath by the belt apparatus which removed the filament from the bath after one minute of travel at a rate of 20 feet per minute. The belt then carried the filament into a zone of warm dry air. After 4 minutes' travel through this zone, the filament was strong enough to be lifted off the belt. After washing free from salt, the filament was drawn to six times its original length over an electrically heated plate at 130° C. and yielded a filament having the following properties: a tenacity of 2.5 grams per denier and a break elongation of 12%.

*Example V*

The aqueous polymer dispersion of Example II was extruded through the glass capillary spinneret of Example IV into a bath of 32% aqueous solution of calcium thiocyanate. After a bath travel of 1 foot at 20 feet per minute, the filament was lifted from the bath by the belt apparatus and dried sufficiently to coalesce during 2 feet of travel in air at room temperature. After washing free from salt, the fiber was drawn to six times its original length to yield physical properties similar to those of the fiber of Example IV.

*Example VI*

A 500 cc. three-neck round-bottomed flask was fitted with a nitrogen inlet, stirrer, and reflux condenser and immersed in a 35° C. water bath. To the nitrogen-flushed flask were added these ingredients:

120 grams freshly distilled water
2 grams sodium "Lorol" sulfate PT
79.59 grams acrylonitrile (water-washed and distilled)
0.382 gram ethylene diacrylate (washed with 5% sodium hydroxide then with water and dried over "Drierite")
0.1 gram potassium persulfate
0.0333 gram sodium bisulfite After 18 hours of stirring, the polymer particles in the resulting dispersion were found to be in the form of spheres about 0.1 micron in diameter. The dried polymer readily dispersed in dimethylformamide to form an opaque suspension of similar sized particles. Even after a week of shaking, the suspension did not become any more transparent, although a product made in the same way without the ethylene diacrylate produced a transparent solution immediately upon mixing with dimethylformamide.

The polymerization mixture was extruded into a room temperature bath consisting of 70% zinc bromide and 30% water. The extruded stream of dispersion changed into a rubbery, transparent filament which was withdrawn from the salt bath and washed in water. It was then drawn to four times its original length while in contact with a metal plate at 160° C. The resulting filament was strong, hard and lustrous.

Copolymers of acrylonitrile/divinyl benzene can be converted to filaments in a similar fashion.

*Example VII*

An aqueous dispersion containing 40% of a copolymer of acrylonitrile/butadiene (88%/12%) was extruded into a water bath containing 2% hydrochloric acid. A filamentary coagulum was formed which was then carried into a bath of 56% aqueous calcium thiocyanate by means of a moving belt. In this latter bath it coalesced within a few seconds to a transparent, rubbery, gel-like filament which, after washing in water, was drawn to six times its original length in a stream of atmospheric steam. The resulting filament was strong and lustrous.

*Example VIII*

The aqueous polymer dispersion of Example II was flowed onto a casting wheel which was partially immersed in a 35% aqueous solution of calcium thiocyanate. A current of air heated to 70° C. was directed against the coagulated polymer dispersion after it had passed through the bath. This resulted in the formation of a tough, rubbery film due to coalescence of the polymer. This rubbery film was lifted from the casting wheel and stretched simultaneously in both directions to produce a tough, transparent, flexible, oriented film.

*Example IX*

The method of Example VIII was used to prepare a film from the dispersion of Example VI. A tough, rubbery film was obtained which could be oriented by stretching.

As shown above, the dispersions are readily fluid, especially when polymer concentration is less than about 50% by weight. The steps involved in the preparation of shaped objects from the polymer dispersion include the shaping of the dispersion in substantially the desired form by extruding it through a shaped orifice into a coagulating or immobilizing medium. During this first stage of the process, Brownian motion of the polymer particles stops, and the polymer particles form a fragile gel-like structure. In the second stage of the process, the polymer particles flow together, perhaps by surface tension activated flow, under the solvent action of the concentrated aqueous salt solution. At this stage, it is preferred that the salt present in the strucure be totally dissolved, but this is not necessary. Of course, when insoluble additives have been added to the dispersion total solution does not result.

While room temperatures or lower can be used, it is generally preferred that heat, for example, temperatures of the order of 30–175° C. be employed momentarily in the transformation of the fluid dispersion during coalescence to a transparent coherent film or fiber, since less time is required. Heat is particularly desired when a continuous process is employed in the preparation of films and fibers or when it is desired that the coalescence step consume a time of the order of a few seconds or less. Heat is also employed for polymers of high minimum solution temperature. With short contact time, the actual temperature achieved is relatively immaterial with respect to the degradation of polymer.

A subsequent step involves the removal of the salt from the shaped polymer and is readily effected by washing with water. The resulting polymer structure may be dried and then aftertreated with boiling water. For example, the article may be stretched to orient the molecules to effect increase in physical properties. On the other hand, the coalesced structure may be as least partially oriented by drawing prior to the washing step.

The coagulating medium, as stated previously, is an aqueous solution of any strong (i.e. highly ionized) electrolyte. Coagulation is practically instantaneous, the time required being of the order of 0.04 second, regardless of the electrolyte used or its concentration. Any strong electrolyte, organic or inorganic may be used. For example, the electrolyte may be a strong acid, base, or salt and is generally used in low concentration, e.g. 1–40% by weight of the aqueous solution. Among preferred coagulants are aqueous solutions containing 2% by weight hydrochloric acid and dilute aqueous solutions of the same salt that is used in the more concentrated, coalescing bath.

Other strong non-solvent electrolytes (whose concentrated solutions do not dissolve the polymer), which have been used successfully as coagulants in dilute aqueous solution are: potassium aluminum sulfate, ammonium thiocyanate, sodium chloride, hydrobromic acid and hydriodic acid. Weak electrolytes such as acetic acid are virtually ineffective. For example, when extruded into 5% aqueous acetic acid, the stream of polymer dispersion was rapidly dispersed throughout the acid bath, a behavior identical to that obtained on extrusion into plain water. If the electrolyte is a solvent for the polymer when in concentrated aqueous solution, the coagulated shaped article can be coalesced to a strong rubbery article by merely air drying it. If on the other hand, a non-solvent electrolyte is used, the coagulated shaped article must be exposed to the action of a solvent salt solution in a subsequent stage of the process.

The salts used in coalescing the dispersion of acrylonitrile polymer in the form of shaped articles are water-soluble salts, preferably metal salts of inorganic acids. These salts should be sufficiently soluble in water to yield 10% solutions, and preferably, at least 30% solutions. Furthermore, concentrated aqueous solutions of the salt must be capable of dissolving the polymers at some temperature up to the boiling point of the salt solution (for example from 0 to 175° C., and generally from 20° C. to 90° C.).

This is readily determined by placing 0.1 gram of the finely divided polymer in 10 ml. of concentrated aqueous salt solution and stirring the mixture, with heating, if necessary, and observing whether the polymer balls up to a coherent mass and/or passes into solution.

Soluble low molecular weight polymers tend to pass rapidly into solution, while soluble high molecular weight polymers absorb the salt solution and coalesce before slowly passing into solution.

Salts which meet the foregoing test will coagulate a polymer dispersion when in dilute aqueous solution and coalesce the coagulated shaped structure to a relatively strong rubbery article when in concentrated aqueous solution. Included among the many salts which may be used are lithium thiocyanate, lithium iodide, lithium bromide, sodium thiocyanate, sodium iodide, potassium thiocyanate, magnesium thiocyanate, calcium thiocyanate, calcium iodide, calcium bromide, calcium nitrate, manganese thiocyanate, zinc thiocyanate, zinc iodide, zinc bromide, zinc chloride, cadmium iodide, and the like. The salts operable for use in the process of this invention are in general found among the water soluble thiocyanates, iodides, bromides, and chlorides of group I and II metals of atomic numbers 3 to 48 or compatible mixtures of these salts. The preferred salts are the thiocyanates. Organic thiocyanate salts, such as guanidine thiocyanate, are also applicable. Also, concentrated acids, such as 65% to 85% sulfuric acid, may be used as coalescing agents. Usually the concentrations of salts in the coalescing baths vary with the salts, but generally concentrations greater than 40% are used.

The coalescence of the coagulated shaped structure to a coherent rubbery structure of substantially the same shape as the coagulated structure is indeed a novel effect. As the polymer dispersion leaves the extrusion orifice, it coagulates into an elongated article whose cross-section conforms to that of the extrusion orifice. This coagulation occurs very rapidly in the vicinity of the extrusion orifice, whether or not the coagulating medium contains sufficient solubilizing salt to dissolve the polymer. Coalescence, however, does not occur until the coagulated article is exposed to an aqueous salt solution which exerts solvent action on the polymer. This coalescence, which is due to the change of the dispersed polymer particles to the solution state, is marked by an abrupt change from an aqueous fluid or paste-like material to a clear material, ranging in viscosity and appearance from a clear syrup to a clear, tough rubber, dependent on such factors as the molecular weight and concentration of the dissolved polymer. Although many ionizable salts apparently yield peptized dispersions of the polymers of this invention, the peptized dispersions will not coalesce unless the salts are those showing solvent action for the polymer in the test referred to above.

Exact conditions of solubility, and correspondingly the ability to be coalesced, vary somewhat with each combination of polymer and salt. The time required for coalescence in a solvent salt solution depends on the relative solubility of the polymer in the salt bath, the temperature of the bath, and the denier or thickness of the shaped article. Fine denier filaments, e. g. 10 denier or less, will coalesce in saturated aqueous solutions of solvent salts in about two seconds, whereas heavy denier filaments, of the order of 200 denier, will require one minute or more exposure to the same saturated salt solution. Elevated temperatures shorten the required contact time. When air drying is used to concentrate the salt solution adhering to the coagulated shaped article to the point where the polymer is soluble in the salt solution, the same considerations apply. Fine denier filaments and high temperatures are more conducive to rapid coalescence than heavy denier filaments and room temperature. In addition, the solubilizing salt concentration becomes a factor, higher concentrations promoting more rapid coalescence. As an example of the influence of these various factors, a polyacrylonitrile filamentary structure of approximately 200 denier coagulated in an 8% by weight aqueous calcium thiocyanate solution required twenty minutes' heating in an oven at 100° C. to coalesce, while a 10 denier filament coagulated in a 28% by weight calcium thiocyanate solution required only 10 seconds in room temperature air to coalesce.

Preferably, the spinning of filaments is carried out with the aid of spinning tubes, such as described in Millhiser U. S. Patent 2,440,057 or in Drisch et al. U.S. Patent 2,511,699. These tubes of relatively small diameter and of substantial length confine the fragile filaments in their critical stage of formation so that no substantial tension is imposed on the filaments because the speed of the cocurrent bath flow through the tube is maintained only slightly below the speed of the filaments passing through the tube. It is thus possible to increase materially the rate of spinning over methods earlier described without substantial sacrifice in continuity and in the desirable properties of the yarn produced.

Another method for easy handling of the coagulated fragile shaped article obtained in the first stage of this process involves the use of a mechanical support, such as the endless belt arrangement illustrated in the figure. In this drawing, the polymer dispersion is fed through a pipe 1 to a spinneret or suitable shaped orifice 2 and into the coagulating bath 3. The freshly formed fragile article 4 is then carried by the driven endless belt 5 into the next bath 6. The belt 5 is supported by rollers 9 at least one of which is driven. The bath 6 may be an aqueous solution containing enough solubilizing salt to dissolve the polymer, in which event the polymer comprising the shaped article coalesces and the shaped article gains in strength sufficiently so that it can be removed from the bath over guide or roller 8 and handled with ease in accordance with prior art after-treatments. On the other hand, when the bath 3 contains a non-solvent concentration of a solubilizing salt, the freshly formed structure can be coalesced by evaporation of water by means of an air stream from the nozzle 7. If this method is used, the bath 6, conveniently formed using partition 10, will contain water or some other suitable medium for washing the coalesced polymer structure free from salt and other soluble occluded materials.

In addition to water and polymer, the dispersion can contain dispersing agents, pigments, "non-solvent" salts, dyes, clay, silica, alcohol, acetone, and similar materials frequently added to shaped articles such as filaments and films. The dispersions are readily prepared by mixing finely divided polymer with water in the amount desired. The polymer should have a particle size less than about 15 microns, preferably 0.005 to 1.5 microns. Such sizes are obtained by mechanical means, such as by use of micronizers, homogenizers, ball mills and similar pulverizers if the polymer used is not already in a finely divided state. Suspensions of appropriately fine polymers, as obtained from emulsion polymerization processes in aqueous media, may be employed directly and are preferred.

In general, water-insoluble acrylonitrile polymers having a molecular weight of 10,000 or higher are suitable for use in this invention. The preferred polymers for preparing films and fibers contain at least 50% by weight of acrylonitrile in the polymer molecule, the remainder of the molecule being made up of recurring units of a polymerizable, monoethylenically or polyethylenically unsaturated monomer. A particular advantage of the process of this invention is that polymers of high molecular weight, for example, of the order up to 1,000,000 or more, surprisingly are even more susceptible to use than those of lower molecular weight. This is an advantage, since usually the properties of products obtained from the higher molecular weight materials are superior to those formed from corresponding, lower molecular weight polymers. Unexpectedly, films and filaments prepared in accordance with this invention are not as brittle as those prepared by the ordinary solution processes well known to the art.

The shaped articles of this invention are very susceptible to plasticization and to dye take-up as compared with similar articles shaped from organic solvent solutions of the acrylonitrile polymers. The products possess the high strength, flexibility and toughness required for fiber and film applications.

The acrylonitrile polymer articles prepared by the process of this invention are dyed by the same techniques and with the same classes of dyestuffs as similar filaments prepared by conventional dry and wet spinning techniques. While it has been known that dispersed acetate dyes can be applied to polyacrylonitrile yarns, the types of useable acetate colors have been limited to those dye molecules which contain a primary aromatic amino functional group. It has now been found that acetate dyes containing alkali soluble functional groups, such as hydroxy, mercapto, carboxy or enol hydroxy groups, can also be applied to the yarns by a modified dyeing technique which employs an alkaline bath containing potassium ion. The typical dye bath formulation for the application of the alkali soluble azo dyes is:

20% dye
20% potassium hydroxide
200% potassium carbonate
2% meta-toluidine (based on the bath)
20:1 bath:fiber ratio The filamentary material is dyed one hour at the boil, rinsed and subsequently boiled for 30 minutes in a 1% sulfuric acid bath.

By this invention the difficulties of fabrication from solutions of high molecular weight polymers, such as balling up, high viscosities and chemical degradation, are avoided since the dispersions are fluid. Furthermore, the dispersions can be, and preferably are quite concentrated with respect to the amount of polymer present. In addition, the process of this invention can be used successfully with polymers that have molecular weights so high that ordinary solution spinning techniques are inapplicable. A further advantage of the process is that isolation of polymer, when it is prepared as an aqueous dispersion, is not required. Finally, since the temperatures employed in the process of this invention are low, in the vicinity of room temperature, the products are not discolored during formation and are essentially white. A still further advantage lies in the fact that unmodified polymer dispersions are spun; ball-milling operations are not required, and it is not essenital to evaporate water to get coalescence.

Since organic vinyl type polymers of high quality are usually best prepared in aqueous dispersion, fabrication processes operable directly on the dispersion without isolation and dissolving of the polymer are particularly economical. In addition, the relatively low viscosity of high solids dispersions compared with high viscosity solutions, the cheapness and safety of water media, and the ability to handle difficultly soluble polymers of unusually good properties in aqueous dispersion, are distinct advantages.

Any departure from the above description which conforms to the present invention is intended to be included within the scope of the claims.

I claim:

1. A process for the production of a continuous shaped article from a water-insoluble acrylonitrile polymer containing at least about 50% by weight of acrylonitrile in the polymer molecule and having a molecular weight of at least 10,000, which comprises extruding an aqueous discrete particle dispersion of the said polymer into an aqueous bath containing at least 1% of a strong electrolyte, the polymer being present in the said dispersion in a concentration of from about 10% to about 50% by weight with a particle size of less than about 15 microns, and contacting the extruded acrylonitrile polymer with an aqueous coalescing solution containing at least 10% by weight of an inorganic salt concentrated solutions of which are solvents for said polymer, said contacting being continued for sufficient time to provide a shaped article coalesced sufficiently for subsequent drawing.

2. The process of claim 1 wherein the said dispersion contains from about 20% to about 40% by weight of said polymer.

3. The process of claim 1 wherein the strong electrolyte and the inorganic salt are the same chemical compound and a single bath is employed.

4. The process of claim 1 wherein the extruded polymer is led into an aqueous coalescing solution containing less than 10% by weight of the inorganic salt and the contacting of the shaped structure with a more concentrated solution of the salt is accomplished by drying the shaped structure, in the absence of a washing step, after the removal of the shaped structure from the coalescing solution.

5. A process for the production of a continuous shaped article from a water-insoluble acrylonitrile polymer containing at least about 50% by weight of acrylontrile in the polymer molecule and having a molecular weight of at least 10,000, which comprises extruding an aqueous discrete particle dispersion of the said polymer into an aqueous bath containing at least 1% of a strong electrolyte, the polymer being present in the said dispersion in a concentration of from about 10% to about 50% by weight with a particle size of less than about 15 microns, and thereafter contacting the extruded acrylonitrile polymer with an aqueous coalescing solution containing at least 10% by weight of an inorganic salt concentrated solutions of which are solvents for said polymer, and subsequently drawing the extruded acrylonitrile polymer.

6. The process of claim 5 wherein the said polymer is polyacrylonitrile.

7. The process of claim 5 wherein the discrete particles of polymer in the said dispersion range in size from about 0.2 micron to about 0.005 micron.

8. A process for the production of a continuous textile fiber from a water-insoluble acrylonitrile polymer containing at least about 50% by weight of acrylonitrile in the polymer molecule and having a molecular weight of at least 10,000, which comprises extruding an aqueous discrete particle dispersion of the said polymer into an aqueous bath containing at least 1% of a strong electrolyte to coagulate the polymer, the polymer being present in the said dispersion in a concentration of from about 10% to about 50% by weight with a particle size of less than about 15 microns, and thereafter contacting the coagulated acrylonitrile polymer filament with an aqueous coalescing solution containing at least 10% by weight of an inorganic salt concentrated solutions of which are solvents for said polymer, to coalesce the coagulated filament and subsequently drawing the coalesced acrylonitrile polymer filament to form a textile fiber.

9. The process of claim 8 wherein the said polymer is polyacrylonitrile.

10. The process of claim 8 wherein the discrete particles of polymer in the said dispersion range in size from about 0.2 to about 0.005 micron.

11. The process of claim 8 wherein the coalescing solution contains at least about 40% by weight of the inorganic salt.

References Cited in the file of this patent

UNITED STATES PATENTS

| | | |
|---|---|---|
| 2,140,921 | Rein | Dec. 20, 1938 |
| 2,385,920 | Jenkins | Oct. 2, 1945 |
| 2,530,362 | Morris | Nov. 14, 1950 |
| 2,585,444 | Coxe | Feb. 12, 1952 |